Aug. 23, 1960  K. NEUBECK  2,950,147
LOAD COMPENSATING BRAKE CONTROL APPARATUS FOR RAILWAY CARS
Filed Oct. 20, 1958
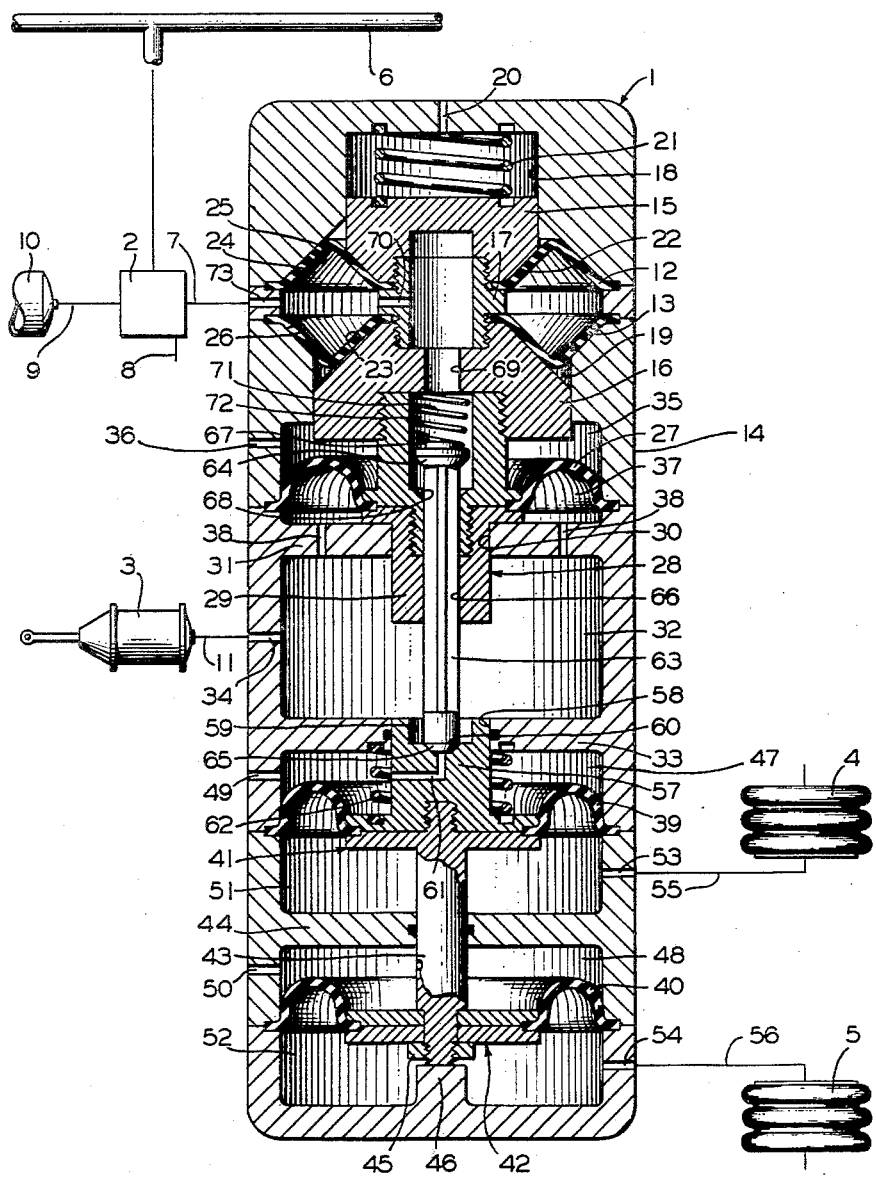
INVENTOR.
Karl Neubeck
BY
Adelbert O. Steinmiller
Attorney 2,950,147
Patented Aug. 23, 1960

2,950,147

LOAD COMPENSATING BRAKE CONTROL APPARATUS FOR RAILWAY CARS

Karl Neubeck, Hannover, Germany, assignor to Westinghouse - Bremsen - Gesellschaft, m.b.H., Hannover, Germany Filed Oct. 20, 1958, Ser. No. 768,460

Claims priority, application Germany Oct. 30, 1957

9 Claims. (Cl. 303—22)

This invention relates to load compensating brake control apparatus for vehicles, such as railway cars and trains, and more particularly to an improved apparatus of the above type comprising the combination of a variable effective area relay valve device, operative responsively to charging of a control pipe under the control of the operator, for establishing and controlling the degree of fluid pressure in a brake cylinder, and a pneumatically controlled load sensing device which so modifies the operation of the relay device as to cause it to establish a brake cylinder pressure which varies according to the load on the vehicle.

Present conventional load compensating brake control combinations for vehicles, such as railway cars, which provide braking according to load utilize lever and linkage components which result in undesirable frictional losses. It is the purpose of this invention to provide an improved load compensating brake control device wholly operable by pressure of fluid acting on variable and non-variable area diaphragm surfaces which is novel in operation and eliminates frictional losses.

According to the invention, a relay valve device comprising a pair of opposed variable effective area diaphragms subjected to an operator-established control fluid pressure controls the supply of fluid under pressure to the brake cylinder. Valve members of the relay valve device are variously positioned by one or more fluid pressure responsive diaphragms subject to the fluid pressure in the air springs supporting the vehicle to adjust the fluid pressure established in the brake cylinder by the relay valve, for any given control pressure, to different values varying with the load in the vehicle.

In the accompanying drawing the single figure is a diagrammatic view, mainly in section, showing the load compensating brake control apparatus embodying the invention.

Description

In the drawing, the apparatus shown comprises a load compensating brake control device 1 connected at one side to a control valve device 2 and a brake cylinder device 3 and at the opposite side to two air springs 4 and 5.

The control valve device 2 is a triple valve, or similar type of valve, of any well-known construction, which responds to charging of a brake pipe 6 to release fluid under pressure from a control pipe 7 via a release pipe 8 of device 2 and to charge via a pipe 9 an auxiliary reservoir 10 with fluid under pressure, and which responds to a reduction in brake pipe pressure below its normal charge value to cut off the brake pipe 6 from the auxiliary reservoir 10 and to supply fluid under pressure from the auxiliary reservoir 10 to the control pipe 7 and to the brake cylinder device 3 through a pipe 11, under control of device 1 as hereafter more fully explained.

Air springs 4 and 5 may be of suitable type each disposed on opposite transverse sides and adjacent one end of a vehicle and interposed between the sprung portion and the unsprung portions of said vehicle. Air springs 4 and 5 are inflated with fluid under pressure, controlled in well-known manner, as by corresponding leveling valve devices (not shown) so as to maintain the sprung portion at a substantially uniform height above the unsprung portion irrespective of the load. Thus it will be apparent that the fluid pressure inflating the air springs is a measure of the load on the vehicle and such fluid pressure is utilized in the manner presently to be described for modifying the operation of the control device 1 accordingly.

The load compensating brake control device 1 comprises a pair of identical flexible annular diaphragms 12 and 13 arranged in coaxial opposed relation within a sectionalized casing 14, the diaphragms being clamped about their outer edges between sections of the casing 14. A diaphragm follower assemblage is provided comprising cylindrical diaphragm followers 15 and 16 each having screw-threaded connection with opposite ends of a common stud 17 at respective opposite ends of stud 17 and clamping the inner edges of the respective diaphragms therebetween. The unclamped annular areas of both of these diaphragms are formed as identical V-shaped corrugations facing in opposite directions. The cylindrical followers 15 and 16 each slidably engage in corresponding aligned bores 18 and 19, respectively, formed in the casing 14. The bore 18 for the follower 15 of diaphragm 12 is smaller in diameter than bore 19 and is constantly open to atmosphere through a port 20. A spring 21 exerts a downward biasing force on the follower 15 for a purpose later explained. The followers 15 and 16 have conical end faces 22 and 23, respectively, which normally engage the adjacent conical sides of the V-shaped corrugations of diaphragms 12 and 13, respectively.

Between the diaphragms 12 and 13 is a chamber 24, which when charged with fluid pressure, supplied from control pipe 7, tends to force the outer surfaces of diaphragms 12 and 13 in opposite directions into contact with the conical end faces 22 and 23 respectively and also into contact with corresponding conical side walls 25 and 26 of the casing 14. Walls 25 and 26 extend outwardly from bores 18 and 19 respectively to the clamping faces of the casing sections at which the outer edges of the diaphragms are clamped. Because the bore 19 is larger in diameter than the bore 18, the unsupported annular areas of the diaphragms in the positions shown in the drawing are substantially equal. However, upon upward movement of the followers 15 and 16, due to upward force of fluid pressure acting on a diaphragm 27, the effective area of diaphragm 12 decreases and that of diaphragm 13 increases, with the result that a progressively increasing net differential effective area of the two diaphragms occurs so that a counterbalance downward force is exerted by the pressure of fluid acting, in chamber 24, downwardly on diaphragm 13.

Annular flexible diaphragm 27 is coaxially arranged with diaphragm members 12 and 13 and is secured adjacent its outer edge between sections of casing 14 and adjacent its inner edge between parts of a coaxially arranged diaphragm follower assemblage 28 attached as by a screw and thread connection at its upper end to diaphragm follower 16. At its lower end, assemblage 28 has a cylindrical portion 29 that extends downward in slidable relation through a central circular aperture 30 in a transverse partition 31 in casing 14 into a delivery chamber 32 formed between partition 31 and another transverse partition 33. Delivery chamber 32 is open to the brake cylinder device 3 via a port 34 in casing 14 and pipe 11. Formed in casing 14 at the upper side of diaphragm 27 is a chamber 35 constantly open to atmosphere through a port 36 and at the opposite or lower side is a chamber 37 constantly and unrestrictedly open to delivery chamber 32 via a plurality of ports 38.

At the lower side of partition 33 there are two identical coaxially arranged annular diaphragms 39 and 40 respectively clamped at their outer edges between sections of casing 14 and at their inner edges between parts of respective diaphragm follower assemblages 41 and 42. Assemblages 41 and 42 are connected to each other through a common stem 43 formed integrally with diaphragm follower assemblage 41 and which extends downwardly through a central circular opening in a transverse partition 44 in casing 14 located between the diaphragms 39 and 40. Follower assemblage 42 comprises two clamping collars secured to a reduced threaded end portion of stem 43 by a nut 45. The lower end of stem 43 engages a stop member 46 which is preferably adjustable in height, carried on the end section of the casing 14.

Formed at the upper sides of diaphragms 39 and 40 are chambers 47 and 48, respectively, both constantly open to atmosphere through ports 49 and 50. At their lower sides, diaphragms 39 and 40 are subject to the pressure of fluid in respective fluid pressure chambers 51 and 52 which in operation are constantly charged to the pressure of fluid in air springs 4 and 5 respectively via ports 53 and 54 and pipes 55 and 56 respectively.

Diaphragm follower assemblage 41 has an upwardly extending cylindrical portion 57 that extends slidably in sealed relation through a central circular opening 58 in partition 33 and into delivery chamber 32. The upper end of the cylindrical portion 57 is recessed at 59 and an annular valve seat 60 is formed at the bottom of the recess 59. A passage 61 is open at one end to the valve seat 60 and at the other end to atmospheric chamber 47. A light helical spring 62 surrounds cylindrical portion 57 and is seated at its opposite ends in annular grooves formed in partition 33 and in the diaphragm assemblage 41, to bias the combined assemblage of diaphragms 39 and 40 downwardly to effect engagement of stem 43 with stop 46.

A cylindrical fluted valve stem 63, having an integrally formed poppet valve 64 at its upper end and a pin type valve 65 integrally formed at its lower end is slidably disposed in an axial bore 66 of diaphragm follower assemblage 28. The upper end of bore 66 opens into a bore 67 at the bottom of which is an annular valve seat 68 on which valve 64 (hereafter called the supply valve) seats. Bore 67 is open to chamber 24 via an axial bore 69, in diaphragm follower 16, and a plurality of transverse ports 70 (only one of which is shown) in stud 17.

A light conical spring 71 is interposed in a chamber 72 between valve 64 and a shoulder at the upper end of bore 67 to bias valve 64 toward valve seat 68. In the positions of parts as shown, the pin valve 65 (hereafter called the exhaust valve) seats on valve seat 60.

*Operation*

Assume initially that the brake pipe 6 has been charged to its normal charge value under operator control by supply of fluid under pressure to the brake pipe in the well-known manner, and that brake control valve device 2 has responded to charging of said brake pipe to charge auxiliary reservoir 10 with fluid at the pressure of fluid in the brake pipe and also to connect control pipe 7 to release pipe 8. Assume also that air springs 4 and 5 are respectively charged with fluid at such pressure as may be necessary to maintain the sprung portion or vehicle body, when not loaded, at a preselected height above the unsprung portion and that diaphragms 39 and 40 of device 1 which are subject to the pressure of fluid in air springs 4 and 5 respectively, reflect the cumulative force applied by the fluid pressure in said air springs against bias spring 62. Under usual conditions the fluid pressures in air springs 4 and 5 should be substantially the same but, under different loading conditions the fluid pressures therein may not necessarily be the same.

Under the assumed conditions, spring 21 at the upper side of follower 15 biases diaphragm follower assemblage 28 to a release position, in which it is shown, defined by contact of diaphragm follower assemblage 28 with the partition 31, and diaphragms 39 and 40 will be biased by spring 62 to a no load position, in which the lower end of stem 43 engages stop 46, as shown in the drawing.

With the diaphragm follower assemblages 41 and 42 correspondingly disposed, spring 71 acting through stem 63 biases exhaust valve 65 against seat 60. Exhaust valve 65 thus cuts off delivery chamber 32 from exhaust passage 61. At the same time, supply valve 64 will be positioned, as shown in the drawing, a predetermined axial distance above valve seat 68 as determined by the force applied to stem 63 by diaphragm follower assemblages 41 and 42.

When brake pipe pressure is reduced under operator control in the usual manner for causing a brake application and control valve device 2 operates to supply fluid from the auxiliary reservoir 10 to control pipe 7 at a pressure corresponding to the extent of such reduction, such fluid will flow from pipe 7 to control chamber 24 of device 1, via a port 73 through the wall of casing 14 and from control chamber 24 to delivery chamber 32 via ports 70, bore 69, chamber 72, and bore 66, and from delivery chamber 32 to the brake cylinder device 3 via port 34 and pipe 11. The fluid pressure established in chamber 32 acts through ports 38 to exert an upward force on the lower face of diaphragm 27. As the pressure of fluid in the control chamber 24 and in chamber 37 increases, diaphragm 27 will be deflected correspondingly upward and will cause diaphragm assemblage 28, diaphragm followers 15 and 16 and stud 17 to move upward against the force of spring 21 while spring 71 continues to bias exhaust valve 65 against its seat 60.

With the upward movement of followers 15 and 16, the combined effective area of diaphragms 12 and 13 progresively increases, as previously explained, and acts in opposition to the upward force exerted by diaphragm 27. However, assemblage 28 continues to move upwardly until valve seat 68 is raised into seating contact with supply valve 64 to cut off the supply of fluid under pressure past valve 64. Moreover, if the fluid pressure in chamber 24 is sufficient when acting over the increased net differential effective area of diaphragms 12 and 13 to move the assemblage 28 downwardly, supply valve 64 will again be unseated and fluid under pressure will be supplied past the valve to further increase brake cylinder pressure and effect a consequently increased upward force on diaphragm 27 to overcome the downward force exerted by diaphragms 12 and 13 to again effect seating of valve 64 on the valve seat 68 and thus cut off the further supply of fluid under pressure to the brake cylinder.

If the pressure in control pipe 7 is still further increased, by further reduction of the pressure in the brake pipe 6, the downward force of fluid pressure in chamber 24 acting on the net differential effective area of diaphragms 12 and 13 will shift the assemblage downwardly to effect unseating of supply valve 64. Fluid at the increased pressure will thus be supplied to the brake cylinder and when the brake cylinder pressure acting upwardly on diaphragm 27 sufficiently counterbalances the downward force, assemblage 28 will be raised to effect reseating of valve 64, and a consequent termination of a further increase in brake cylinder pressure.

When control pipe pressure and hence pressure in chamber 24 is reduced for releasing brakes, the consequent reduction in the downward force exerted on diaphragms 12 and 13 will cause the pressure of fluid bottled up in the delivery chamber 32 and chamber 37 to shift assemblage 28 upwardly carrying supply valve 64 with it and correspondingly causing exhaust valve 65 to be unseated for thereby causing the fluid in the delivery chamber 32 and the brake cylinder device 3 to be exhausted to atmosphere via passage 61. If control pipe pressure is only partially reduced, brake cylinder pressure will be proportionately reduced; whereupon the exhaust valve 65 will be reseated for again bottling up fluid in the brake cylinder at such reduced pressure. A graduated release of the brakes may thus be effected.

If the control pipe 7 is completely vented, that is restored to atmospheric pressure, pressure of fluid in chamber 24 will be correspondingly reduced and the pressure of fluid acting on diaphragm 27 in chamber 37 will quickly cause diaphragm 27 to raise valve seat 68 and valve 64 and thereby via stem 63 unseat exhaust valve 65 for causing the pressure of fluid in delivery chamber 32 to flow past valve seat 60 through passage 61 and to atmospheric chamber 47. As the pressure is reduced in chamber 37, assemblage 28 will be moved downwardly and thus cause valve 65 to again be seated.

Assume now that the vehicle body is loaded to a full load. In this condition the air springs 4 and 5 will be pressurized to a correspondingly higher value and the cumulative increased pressure of fluid acting on diaphragms 39 and 40 will cause the diaphragms to be deflected upward and to lift valve seat 68 upward for raising valve 64 to a maximum unseated vertical distance away from valve seat 68. Upon initiation of a brake application, it will be seen that since supply valve 64 is unseated to a greater extent than was the case in a no load condition, it will require a greater fluid pressure force acting on diaphragm 27 to lift valve seat 68 into engagement with supply valve 64 and therefore the fluid pressure established in brake cylinder 3 will be proportionately higher for a full load than for a no load condition.

It will be noted that supply valve 64 has a lower limit position determined by the engagement of the lower end of stem 43 with stop 46 in order to establish a no load brake cylinder pressure in the brake cylinder device 3. Thus in the event of a brake application occurring under circumstances in which diaphragms 39 and 40 should for some unknown reason fail to exert an upward force, at least a brake cylinder pressure corresponding to a no load condition will be established by reason of the certain downward force exerted by spring 21 on follower 15.

Having now described the invention, what I claim as new and desire to secure by Letters Patent, is:

1. In a vehicle fluid pressure brake apparatus, a load-responsive relay valve device for regulating the brake applying pressure to different values according to variations in the load on the vehicle, said device comprising a valve member, a valve seat member, said valve member and said valve seat member cooperating to control the supply of the brake applying pressure, two opposed fluid pressure responsive diaphragm means for controlling the movement of said valve seat member with respect to said valve member, one of said diaphragm means being a variable effective area diaphragm device arranged to be subjected to a selected pressure established corresponding to a desired degree of brake applying pressure, the other of said diaphragms being of uniform effective area and subjected to the brake applying pressure supplied past said valve member, a fluid pressure responsive device for varying the position of said valve member with respect to said valve seat member, and means for subjecting said fluid pressure responsive device to a pressure corresponding to the load on the vehicle.

2. Vehicle fluid pressure brake apparatus as claimed in claim 1, further characterized by a stop member and resilient means for biasing said fluid pressure responsive device into contact with said stop member upon reduction of the pressure acting on said fluid pressure responsive device to below a certain value, thereby to cause the position of said valve member to be adjusted so as to limit the brake applying pressure to that for a minimum load condition on the vehicle.

3. Vehicle fluid pressure brake apparatus as claimed in claim 1, further characterized in that the variable effective area diaphragm device comprises two oppositely facing variable effective area diaphragms arranged in coaxially spaced relation and subjected to the opposed forces of the established pressure of fluid acting thereon corresponding to a desired degree of brake applying pressure in a chamber formed therebetween and having the net differential effective area thereof subject to said fluid pressure in said chamber effective to exert force in opposition to the brake applying force active on the other of said diaphragms.

4. Vehicle fluid pressure brake apparatus as claimed in claim 1, further characterized in that said valve member carries a supply valve and an exhaust valve, the supply valve cooperating with said valve seat member to control the supply of brake applying pressure, and in that said fluid pressure responsive device carries a second valve seat member with which said exhaust valve cooperates, said exhaust valve being unseated from said second valve seat member to reduce the brake applying pressure in response to force exerted on said valve member by said diaphragm means upon reduction of the established pressure.

5. Vehicle fluid pressure brake apparatus as claimed in claim 3, further characterized in that said valve member carries a supply valve and an exhaust valve, the supply valve cooperating with said valve seat member to control the supply of brake applying pressure, and in that said fluid pressure responsive device carries a second valve seat member with which said exhaust valve cooperates and through which movement of the fluid pressure responsive means adjusts the position of said valve member, said exhaust valve being unseated from said second valve seat member to reduce the brake applying pressure in response to force exerted on said valve member by said diaphragm means upon reduction of the established pressure in said chamber.

6. Fluid pressure brake apparatus of the load-responsive type, comprising a brake cylinder, a control pipe chargeable with fluid at a pressure corresponding to a desired pressure to be established in the brake cylinder, an air spring device charged with fluid at a pressure corresponding to the load on the vehicle, and a control valve device for supplying fluid under pressure to the brake cylinder according to fluid pressure in the control pipe and in varying degree for a given pressure in the control pipe dependent upon the pressure of fluid in said air spring device, said control valve device being characterized by a valve member, a valve seat member, said valve member and said valve seat member cooperating to control the supply of fluid pressure to the brake cylinder, two opposed fluid pressure responsive diaphragm means for controlling the movement of said valve seat member with respect to said valve member, one of said diaphragm means being a variable effective area diaphragm device arranged to be subjected to the pressure established in the control pipe, the other of said diaphragms being of uniform effective area and subjected to brake cylinder pressure supplied past said valve member, and a fluid pressure responsive device subject to pressure of fluid in the air spring device for varying the position of said valve member with respect to said valve seat member in correspondence with the load on the vehicle.

7. Fluid pressure brake apparatus of the load-responsive type as claimed in claim 6, further characterized in that said air spring device comprises a pair of spaced air spring members and in that said fluid pressure responsive device comprises two spaced coaxial movable abutments each subject to the fluid pressure in a corresponding one of said air spring members such that the cumulative force of the pressure of fluid acting thereon is effective to vary the position of said valve member.

8. Fluid pressure brake apparatus of the load-responsive type, comprising a brake cylinder, a control pipe chargeable with fluid at a pressure corresponding to a desired pressure to be established in the brake cylinder, an air spring device charged with fluid at a pressure corresponding to the load on the vehicle, and a control valve device for supplying fluid under pressure to the brake cylinder according to fluid pressure in the control pipe and in varying degree for a given pressure in the control pipe dependent upon the pressure of fluid in said air spring device, said control valve device being characterized by a valve member carrying a supply valve and an exhaust valve, a valve seat member that cooperates with said supply valve to control the supply of the brake applying pressure, a second valve seat member with which said exhaust valve co-operates to control the release of the brake applying pressure, two opposed fluid pressure responsive diaphragm means for controlling the movement of said valve seat member with respect to said valve member, one of said diaphragm means being a variable effective area diaphragm device arranged to be subjected to the pressure established in the control pipe, the other of said diaphragms being of uniform effective area and subjected to brake cylinder pressure supplied past said supply valve, and a fluid pressure responsive device subject to pressure of fluid in the air spring device for varying the position of said supply valve with respect to said valve seat member and said exhaust valve with respect to said second valve seat member in correspondence with the load on the vehicle.

9. In a vehicle fluid pressure brake apparatus, a load responsive relay valve device for regulating the brake applying pressure to different values according to variations in the load on the vehicle, said device comprising a valve member, a valve seat member, said valve member and said valve seat member cooperating to control the supply of the brake applying pressure, two opposed fluid pressure responsive diaphragm means for controlling the movement of said valve seat member with respect to said valve member, one of said diaphragm means being a variable effective area diaphragm device arranged to be subjected to a selected pressure established corresponding to a desired degree of brake applying pressure, the other of said diaphragms being of uniform effective area and subjected to the brake applying pressure supplied past said valve member, and means actuated in response to variations in the load carried by the vehicle for correspondingly varying the position of said valve member with respect to said valve seat member.

No references cited.